United States Patent [19]

Sears et al.

[11] Patent Number: 5,151,017

[45] Date of Patent: Sep. 29, 1992

[54] VARIABLE SPEED HYDROMASSAGE PUMP CONTROL

[75] Inventors: Lawrence Sears, Hunting Valley; John T. Wall, Seven Hills, both of Ohio

[73] Assignee: ITT Corporation, New York, N.Y.

[21] Appl. No.: 700,278

[22] Filed: May 15, 1991

[51] Int. Cl.$^5$ ............................................. F04D 15/00
[52] U.S. Cl. ...................................... 417/45; 417/63; 4/541.3; 318/807
[58] Field of Search ............... 417/45, 63; 4/541, 544; 318/807; 388/811, 827

[56] References Cited

U.S. PATENT DOCUMENTS

| | | |
|---|---|---|
| 4,093,899 | 6/1978 | Denny .................................. 318/772 |
| 4,370,098 | 1/1983 | McClain et al. ....................... 417/45 |
| 4,780,917 | 11/1988 | Hancock ............................... 4/544 |
| 5,005,365 | 4/1991 | Lynch .................................. 417/63 |

Primary Examiner—Richard A. Bertsch
Assistant Examiner—David W. Scheuermann
Attorney, Agent, or Firm—Menotti J. Lombardi

[57] ABSTRACT

A control for a hydromassage pump motor and pump controls the speed thereof at one of a plurality of predetermined speeds. The control includes a high voltage motor power control which is connected to the AC lines and to the motor to affect energization thereof and a low voltage user interface. The low voltage user interface is powered by a low cost, small, limited energy power supply which limits the current to the user interface and which provides electrical isolation from the AC lines.

23 Claims, 2 Drawing Sheets

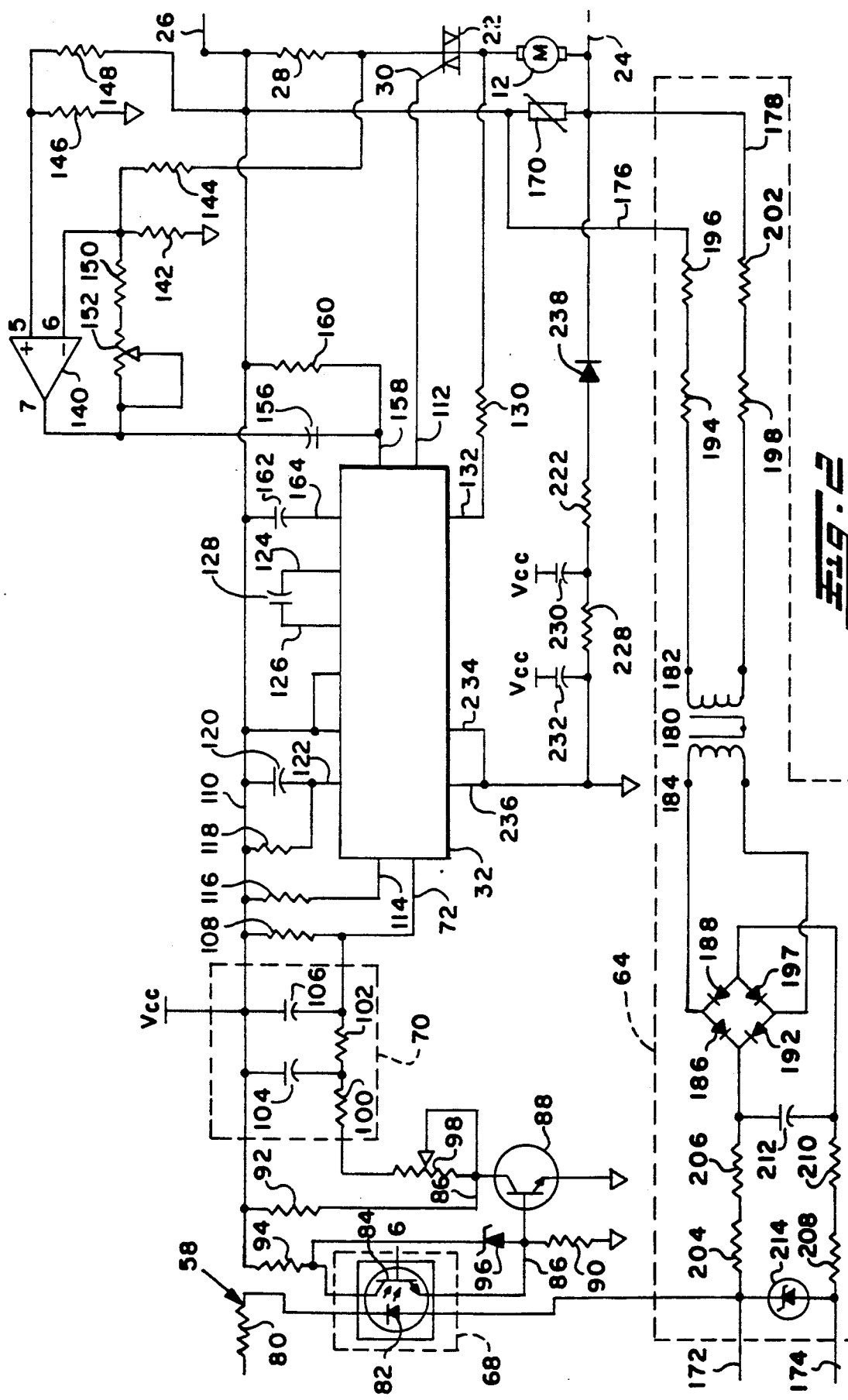

VARIABLE SPEED HYDROMASSAGE PUMP CONTROL

DESCRIPTION

1. Technical Field

The present invention relates to a new and improved control for hydromassage motor and pump for controlling the flow of water through a hydromassage spa tub at one of a plurality of predetermined flow rates.

2. Background of the Invention

Controls for hydromassage spa tub applications are known in the prior art. The known controls are complicated, expensive and large in size.

It is desirable to provide a control for a hydromassage pump which is inexpensive, small in size and which provides electrical isolation between the power portion of the control which powers the hydromassage pump motor and the user interface by which the user turns on the control and sets the desired speed for the motor to thereby control the flow through the hydromassage tub.

SUMMARY OF THE INVENTION

A new and improved control for a hydromassage pump motor for controlling the speed of the pump motor and a pump connected thereto to one of a plurality of predetermined, preset speeds to thereby control the flow of water through the hydromassage pump includes a low voltage user interface and a high voltage motor power control which is connected to and electrically isolated from the user interface. The low voltage user interface includes a storage means for storing therein a plurality of preset speeds, each of which is indicative of a desired pump motor speed, first input means for energizing the pump motor at a speed indicated by the output signal of the storage means, second input means connected to the storage means for indexing the output signal of the storage means and display means responsive to the output signal of the storage means for visually displaying an indication of the state of the motor. The high voltage power control includes a solid state switch means adapted to be connected in series with the pump motor and a source of high voltage electrical energy to energize the pump motor when the switch means is conductive, controller means for controlling the conduction of the switch means and means including an opto-isolator for coupling the output from the storage means to the controller means to control the conduction of the switch means in dependence upon the output signal of the storage means.

Still another provision of the present invention is to provide a control for a hydromassage pump motor for controlling the speed of the pump motor and a pump connected thereto as set forth in the preceding paragraph, further including a limited energy power supply for energizing the user interface wherein the limited energy power supply includes a high frequency transformer and current limiting resistor means series connected with the primary of the high frequency transformer for limiting current flow through the transformer and to the user interface.

A still further provision of the present invention is to provide a new and improved control for a hydromassage pump motor for controlling the speed of the motor and a pump connected thereto at one of a plurality of predetermined preset speeds, including a low voltage user interface and a high voltage motor power control which is connected to, but electrically isolated from, the user interface. The low voltage user interface includes a storage means for storing therein a plurality of preset speeds, input means for energizing the pump motor at a speed indicated by an output signal from the storage means, and display means for visually displaying an indication of the speed of the pump motor. The high voltage power control includes a solid state switch connected in series with a pump motor and source of high voltage electrical energy, controller means for controlling the conduction of the solid state switch, an opto-isolator for coupling the output signal from the storage means to the controller means, and a limited energy power supply having an output for energizing the storage means, the display means, and the input means.

A further provision of the present invention is to provide a new and improved control for a hydromassage pump motor as set forth in the preceding paragraph wherein a limited energy power supply includes a high frequency transformer having a primary coil connected to a source of high voltage electrical energy and a secondary coil coupled to the primary coil, and current limiting resistor means series connected with the primary coil for limiting current flow through the primary coil and allowing the transformer to saturate without excessive current buildup.

BRIEF DESCRIPTION OF THE DRAWINGS

The foregoing and other objects and features of the present invention will become more apparent upon the consideration of the following description taken in conjunction with the accompanying drawings wherein:

FIG. 2 is a schematic circuit diagram more fully illustrating the motor power controller, the opto-isolator, and the limited energy power supply.

DESCRIPTION OF THE PREFERRED EMBODIMENT OF THE INVENTION

Figure 1:
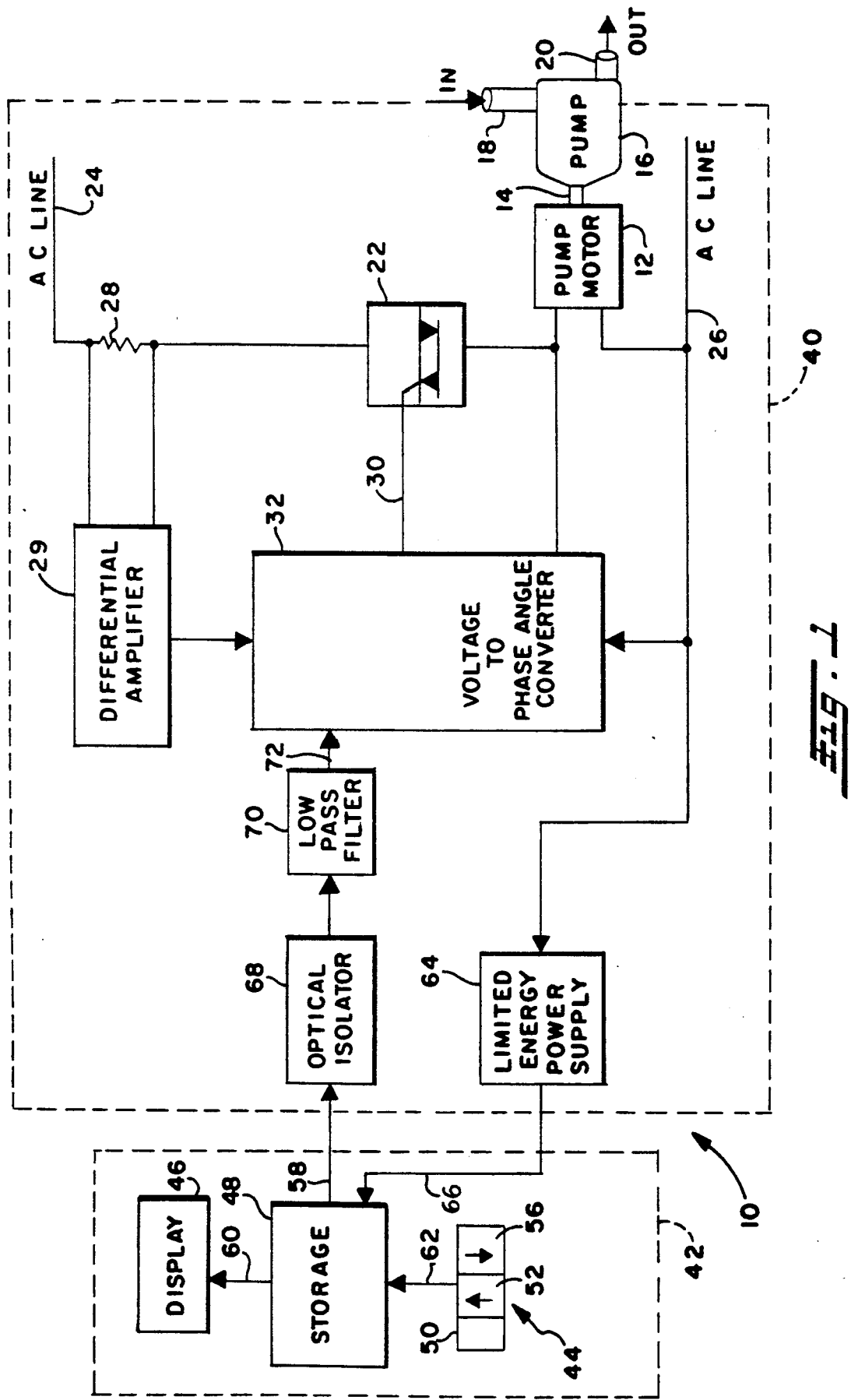
FIG. 1 is a simplified schematic of the variable speed control for the hydromassage pump disclosing the low voltage user interface, the high voltage motor power control, and the motor and pump for the hydromassage spa unit.

Referring to the figures, and more particularly, to FIG. 1, a control 10 for a hydromassage pump motor 12 is illustrated. The pump motor 12 includes an output shaft 14 for driving a pump 16. The pump 16, as is well known, includes an inlet 18 and an outlet 20 through which water normally flows. By controlling the speed of the pump motor 12 the amount of water flow through the pump 16 can be controlled. The inlet 18 and outlet 20 of the pump are connected in a well known manner to a hydromassage spa tub (not illustrated) to control the flow of water through the hydromassage tub.

The motor 12 is adapted to be energized by a triac 22 which is connected between the AC lines 24 and 26. Motor current sensing resistor 28 is connected in series with the triac 22 to provide a feedback signal of motor current as will be described more fully hereinbelow.

Triac 22 includes a gate 30 which is driven by a motor control integrated circuit 32. The motor control integrated circuit 32 is a voltage to phase angle converter for controlling the gate signals on the gate 30 of triac 22, to thereby control the energization and speed of the pump motor 12. In the preferred embodiment, a ZN410E motor speed controller circuit manufactured by Plessey Semiconductors is utilized for the voltage to phase angle converter 32.

The portion of the control 10 within the dashed lines 40 represents the high voltage portion 40 of the control 10 which is connected to or powered by the AC lines 24, 26. A low voltage user interface 42 is also provided to allow a user to interface with the high voltage portion 40 of the control 10 while being electrically isolated from the high voltage portion of the control. In addition, the user interface may be remotely located from the high voltage portion 40 of the control 10. The electric isolation and remote location of the user interface 42 is particularly desirable and important in a hydromassage application to prevent electrical shocks to a user in an environment where water is present and which may be considered extremely hazardous.

The low voltage user interface 42 includes input means 44, a display means 46, and a storage means 48. The storage means 48 stores therein a plurality of preset signals each of which is indicative of a predetermined speed for the pump 16 and pump motor 12. The storage means 48 includes an output 58 on which an output signal is established when the storage means is energized which is indicative of the desired speed of motor 12. The output signal on line 58 has a duty cycle which is indicative of the desired predetermined speed of motor 12 and is pulse-width modulated. Preferably the storage means 48 is a single chip microprocessor which executes a self-contained program which instructs the storage means 48 to perform the following functions: (1) generate a stored predetermined pulse train signal at output 58 that has a plurality (preferably seen) of unique duty cycles; (2) generate the necessary backplane and drive signals for the display 46; and (3) scan the input means 44 to detect a user-generated input.

The display 46 is preferably a liquid crystal bar graph display which visually indicates the output of the storage means 48 and hence the speed at which the pump motor 12 is driven. The storage means 48 includes an output 60 which is connected to the display 46. The storage means generates the backplane and drive signals for the LCD bar graph display which visually indicates the selected speed of motor 12 and the on/off condition of the motor 12.

The input means 44 include first, second and third pushbuttons 50, 52 and 56, respectively, which are connected via line 62 to the storage means 48. The first input means or pushbutton 50 is adapted to energize and de-energize the control 10. When pushbutton 50 energizes the control 10 a signal will be established on the output 58 of the storage means 48, having a duty cycle which is indicative of the desired speed of the motor 12. The second input means 52 and third input means 56 are adapted to sequence the storage means 48 to generate the respective next highest or next lowest preset signal at output 58. In the preferred embodiment, the storage means 48 is operable to store seven preset signals, each of which is indicative of the desired speed of the motor 12 and pump 16. When the input means 52 is energized by pressing the pushbutton 52, the input 52 will index the output speed signal at output 58 of the storage means 48 to the next higher sequential preset speed of the seven preset speeds. When the third input means 56 is energized by pushing the pushbutton 56, the storage means 48 will index the output signal at output 58 of the storage means 48 to the next lower sequential speed of the seven preset speeds.

The output signal on line 58 is directed through an optical isolator 68 and a low pass filter 70 to an input 72 of the voltage to phase angle converter 32. Input 72 is a speed input and controls the conduction of the triac 22 to thereby control the energization and speed of the pump motor 12 and the pump 16.

An optical isolator 68 provides electrical isolation between the high voltage portion 40 of the control 10 and the low voltage user interface 42 and provides a pulse width modulated output signal to the low pass filter 70. The low pass filter 70 filters the pulse width modulated input and provides a DC output signal to the input 72 of the voltage to phase angle converter 32 which is proportional to the duty cycle of the signal on the output 58 of the storage means 48. This AC signal is utilized to control the conduction of triac 22 and hence the motor speed of the motor 12 and pump 16.

A limited energy power supply 64 is adapted to energize the user interface 42 and provides a limited voltage and current source via line 66 to the storage means 48 to power the user interface 42.

Referring more particularly to FIG. 2, the opto-isolator 68, limited energy power supply 64, and voltage to phase angle converter 32 are more fully illustrated. The output signal from storage means 48 is a pulse width modulated signal which is directed from output 58 through a resistor 80 to the opto-isolator 68. The opto-isolator 68 provides a safety isolation barrier between the user interface 42 and the high voltage portion 40 of the controller 10.

The opto-isolator 68 includes an LED 82 and an opto-transistor 84. The signal on line 58 drives the LED 82 which is optically coupled to the opto-transistor 84 which provides a pulse width modulated output signal on line 86 which is proportional to the pulse width modulated output signal at output 58 from the storage means 48. A current limiting resistor 94 is series connected with the collector of opto-transistor 84 to limit the current flow through the opto-isolator 68 and a zener diode 96 is connected across the collector emitter circuit of the opto-transistor 84 to provide over-voltage protection for the opto-transistor 84 in case of failure elsewhere in the controller 10.

The output from the opto-isolator 68 on line 86 is directed to the input of a signal inverter consisting of a transistor 88, a base resistor 90 connected to the base of transistor 88, and a collector resistor 92 connected to the collector of transistor 88. The output from the signal inverter is directed from the collector of transistor 88 through a speed calibration potentiometer 98 to the low pass filter 70.

The low pass filter 70 is a two pole AC filter formed by resistors 100 and 102 and capacitors 104 and 106. The two pole AC filter filters out the AC component of the original signal and establishes a DC signal which is proportional to the duty cycle of the output signal at output 58 of the storage means 48. A resistor 108 is connected to the output of the two pole AC filter to shift the DC output signal close to the +VCC line 110. The output from the low pass filter 70 is directed to the speed input 72 of the voltage to phase angle converter 32. The resulting DC signal applied at input 72 to the voltage to phase angle converter 32 is proportional to the duty cycle of the signal from the output 58 of the storage means 48.

The voltage to phase angle converter 32 includes an internally generated saw tooth ramp signal which is synchronized to the AC power line. A resistor 118 and a capacitor 120 are connected to line 110 and to an input 122 on the voltage to phase angle converter 32. The capacitor 120 and internal circuitry in the voltage to phase angle converter 32 form the saw tooth ramp generator and the resistor 118 is used to compensate for variations in the ramp generator. The saw tooth ramp signal and the DC voltage at the control input 72 are applied to an internal comparator. The point in the AC line cycle where these two signals coincide determines the firing point for the triac 22 and hence the timing of the output pulses on output 112 to the gate 30 of triac 22. The comparator output triggers a monostable circuit disposed within the voltage to phase angle converter 32 which defines the gate drive pulses for the triac 22.

The voltage to phase angle converter 32 includes an input 114 which is connected to the +VCC line 110 via a resistor 116. The resistor 116 supplies current to the internal voltage reference in the voltage to phase angle converter 32.

The use of a pulse width modulated output at the output 58 of storage means 48 provides a significant improvement over the use of a frequency related signal. The use of a pulse width modulated output eliminates variations from control to control due to component variation. The internal comparator in voltage to phase angle converter 32 is biased by the voltage on the +VCC line 110 which may vary. However, the comparator is sensitive to a percentage of the voltage on line 110 rather than to an absolute voltage signal. Thus, if the magnitude of the pulse width modulated signal from the storage means 48 varies due to component or voltage variations, such will be compensated by the comparator within the voltage to phase angle converter 32 due to the fact that the comparator is not sensitive to an absolute voltage but rather to a percentage of the +ACC line 110 voltage and hence will compensate for component or voltage variances.

A capacitor 128 may be connected across inputs 124 and 126 to the voltage to phase angle converter 32. The capacitor 128 cooperates with integral circuitry within the converter or controller 32 to perform a soft start function to reduce motor start up inrush current. Resistor 130 is connected to a sync input 132 of the controller 32 and is also connected to the AC power line. The resistor 130 provides a signal at the input 132 to provide a zero load current synchronizing signal for the controller 32.

The motor current which flows through the shunt resistor 28 connected in series with the triac 22 and motor 12 establishes a voltage signal that is proportional to the motor current. This signal is utilized to provide a current limiting function to the controller 10. The resistor 28 can be calibrated by the use of a voltage divider, not illustrated.

The signal from the shunt resistor 28 is directed to and amplified by a differential amplifier 29 formed by operational amplifier 140, input summing resistors 142, 144, 146 and 148, feedback resistor 150, and a current limit calibration potentiometer 152. The resulting amplified motor current signal is capacitively coupled by a capacitor 156 to a current limit input 158 of the voltage to phase angle converter 32. Circuitry internal to the voltage to phase angle converter 32 rectifies and integrates the motor current limit signal at input 158 and compares it to an internal reference to provide a motor current limiting function by reducing the conduction angle of triac 22. A resistor 160 is connected between the line 110 and the current limit input 158 to serve as a path for bias currents to keep the current limit input DC level close to the +VCC line 110.

The voltage to phase angle converter 32 is powered by a 5 volt power supply formed from a shunt regulator within controller 32, power line dropping resistors 222 and 228, filter capacitors 230 and 232, and diode 238 which is connected to inputs 234 and 236 of controller 32.

A capacitor 162 is connected between line 110 and an input 164 in the voltage to phase angle converter 32. The capacitor 162 serves as a current limit integrator filter capacitor for the voltage to phase angle converter 32. A metal oxide varistor 170 provides power line transient voltage protection.

The limited energy power supply 64 is connected across the metal oxide varistor 170 and provides power to the low voltage user interface 42 via the outputs 172 and 174. The outputs 172 and 174 from the limited energy power supply 64 are electrically isolated from the AC lines 24 and 26 to provide a safety isolation barrier between the user interface 42 and the high voltage portion 40 of the controller 10. In addition, due to space limitations, it is desirable to minimize the space requirements for the low energy power supply 64. This necessitates minimizing the size of and transformer used.

The limited energy power supply 64 includes a pair of inputs 176 and 178 which are connected to the primary 182 of a transformer 180. Transformer 180 is preferably a high frequency transformer such as an audio transformer which has a limited current carrying ability and which is small in size. The transformer 180 includes a secondary 184 which is connected to a full wave drive rectifier formed by the diodes 186, 188, 190 and 192 to provide a DC output at outputs 172 and 174.

It is desirable to limit the space requirements for the limited energy power supply 64 and hence it is desirable to minimize the size of transformer 180. This must be accomplished while providing both current and voltage protection on the outputs 172 and 174. To this end, current limiting resistors 194, 196, 198 and 202 are series connected with the primary coil 182 of the transformer 180. The resistors 194 and 196 and 198 and 202 are series connected to provide redundancy. In the event one of the series connected resistors fails, current protection will still be provided.

Standard transformers operate at 60 CPS and are large and expensive. Smaller transformers, such as audio transformers, cost less and typically are designed to operate at higher frequencies, such as 500-1000 Hz. In the present embodiment, the high frequency audio transformer 180 is saturated every one-half cycle due to the low frequency (60 CPS) applied thereto. The application of 60 CPS to the transformer 180 is acceptable due to the large current limiting resistors 194, 196, 198 and 202 which are series connected with the primary 182 to protect the transformer 180 and limit the power output thereof. While the power output of the transformer 180 is limited, it is enough to drive the integrated circuit 32 and the display 46.

The combination of the small high frequency transformer 180 with the current limiting resistors 194, 196, 198 and 200 provides a small limited energy power supply 64 which limits both output current and voltage to the user interface 42 to allow a user to operate the control 10 without being subjected to the possibility of being shocked with high voltage electrical energy. The small high frequency transformer 180, due to its size and high frequency, will not transfer significant energy at 60 cycles to the user interface 42. The use of the series resistors 194, 196, 198 and 200 allows the transformer 180 to saturate without excessive current buildup. The resistors limit the current and the saturation of the transformer limits the voltage at the outputs of the limited energy power supply 64. This is a distinct improvement over the use of a 60 cycle power transformer which is both large and expensive due to the fact that enough copper and iron must be provided to prevent the transformer from saturating when transferring 60 cycle energy. Transformer 180 being a high frequency transformer, such as an audio transformer, is both small and inexpensive compared to a 60 cycle power transformer.

Resistors 204, 206, 208 and 210 are series connected with the outputs 172 and 174 from the limited energy power supply 64 and provide a DC current limit to limit the maximum output current from the limited energy power supply 64. A capacitor 212 is connected across output lines 172 and 174 for filtering purposes and a zener diode 214 is also connected across output 172 and 174 to regulate the voltage which is supplied at the output.

From the foregoing, it should be apparent that a new and improved control 10 for a hydromassage pump motor 12 for controlling the speed of the pump motor 25 and a pump 16 connected thereto has been provided. The control includes a low voltage user interface 42 and a high voltage motor power control 40 which is connected to an electrically isolated from the user interface. The low voltage user interface 42 includes the microprocessor storage means 48 for storing therein a plurality of preset speeds, each of which is indicative of a desired pump motor speed. The storage means 48 provides an output signal at 58 indicative of one of the plurality of preset speeds. An input means 44 is provided for energizing the pump motor 12 at a speed indicated by the output signal of the storage means. The display 46 is provided and connected to the storage means for visually displaying an indication of the speed of the pump motor. The high voltage power control 40 includes a solid state switch means 22 adapted to be connected in series with the pump motor 12 and the AC lines 24, 26 to energize the pump motor when the triac 22 is rendered conductive. A voltage to phase angle converter 32 controls the conduction of the triac 22 an opto-isolator 68 and a limited energy power supply 64 provide electrical isolation between the user interface 42 and the high voltage power controller 40. The opto-isolator couples the output from the storage means to the voltage to phase angle converter 32 to control the conduction of the triac 22 in dependence upon the output signal from the storage means 48. The limited energy power supply energizes the storage means 48, the display means 46, and the input means 44.

What we claim is:

1. A control for a hydromassage pump motor for controlling the speed of the pump motor and a pump connected thereto to one of a plurality of predetermined preset speeds to thereby control the flow of water through the hydromassage pump comprising a low voltage user interface and a high voltage motor power control which is connected to, but electrically isolated from, said user interface, said low voltage user interface including storage means for storing therein a plurality of preset speeds, each of which is indicative of a desired pump motor speed, said storage means providing an output signal indicative of one of said plurality of said preset speeds, a first input means for energizing the pump motor at a speed indicated by said output signal of said storage means, second input means connected to said storage means for indexing the output signal of said storage means to the next sequential preset speed of said plurality of preset speeds, and display means responsive to said output signal of said storage means for usually displaying an indication of the speed of the pump motor, said high voltage power control including a solid state switch means adapted to be connected in series with the pump motor and a source of high voltage electrical energy to energize the pump motor when the solid state switch means is conductive, controller means for controlling the conduction of said solid state switch means and means including an opto-isolator for coupling said output signal from said storage means to said controller means to control the conduction of said switch means in dependence upon the output signal of said storage means.

2. A control for a hydromassage pump motor for controlling speed of the pump motor and a pump connected thereto as defined in claim 1 wherein said output signal from said storage means has a predetermined duty cycle which is proportional to the desired pump motor speed.

3. A control for a hydromassage pump motor for controlling the speed of the pump motor and a pump connected thereto as defined in claim 2 further including filtering means for coupling the opto-isolator to said controller means, said filtering means filtering the output of said opto-isolator to establish a DC output signal from said filter means to said controller means which is indicative of the desired pump motor speed and is proportional to the duty cycle of said output signal from said storage means.

4. A control for a hydromassage pump motor for controlling the speed of the pump motor and a pump connected thereto as defined in claim 1 further including filtering means for coupling the opto-isolator to said controller means, said filtering means filtering the output of said opto-isolator to establish a DC output signal from said filter means to said controller means which is indicative of the desired pump motor speed.

5. A control for a hydromassage pump motor for controlling the speed of the pump motor and a pump connected thereto as defined in claim 1 further including a limited energy power supply having an output for energizing said storage means, said display means, and said first, second and third input means.

6. A control for a hydromassage pump motor for controlling the speed of the pump motor and a pump connected thereto as defined in claim 5 wherein said limited energy power supply includes a high frequency transformer having a primary coil connected to a source of high voltage electrical energy and a secondary coil coupled to said primary coil, and current limiting resistor means series connected with said primary coil for a limiting current flow through said primary coil.

7. A control for a hydromassage pump motor for controlling the speed of a pump motor and a pump connected thereto as defined in claim 6 wherein said limited energy power supply further includes voltage regulating means connected to the output thereof for regulating the voltage at an output of said limited energy power supply.

8. A control for a hydromassage pump motor for controlling the speed of a pump motor and a pump connected thereto as defined in claim 7 wherein said voltage regulating means comprises a zener diode connected to said output of said limited energy power supply.

9. A control for a hydromassage pump motor for controlling the speed of a pump motor and a pump connected thereto as defined in claim 1 wherein said solid state switch means comprises a triac, said source of high voltage energy comprises an AC power supply and said controller means controls the conduction of said triac at a conduction angle with respect to the phase angle of the AC power supply which is proportional to the duty cycle of said output signal from said storage means to thereby control the speed of the hydromassage pump motor and the volume of fluid flow through the hydromassage pump.

10. A control for a hydromassage pump motor for controlling the speed of a pump motor and a pump connected thereto as defined in claim 9 wherein said display means comprises a liquid crystal bar graph for visually displaying the output speed of the pump motor as indicated by the output signal from said storage means.

11. A control for a hydromassage pump motor for controlling the speed of a pump motor and a pump connected thereto as defined in claim 10 wherein said output signal from said storage means is pulse width modulated.

12. A control for a hydromassage pump motor for controlling the speed of a pump motor and a pump connected thereto as defined in claim 9 wherein said second input means is operable to index said storage means to the next higher sequential preset speed of said plurality of presets speeds.

13. A control for a hydromassage pump motor for controlling the speed of a pump motor and a pump connected thereto as defined in claim 9 wherein said second input means is operable to index said storage means to the next lower sequential preset speed of said plurality of presets speeds.

14. A control for a hydromassage pump motor for controlling the speed of the pump motor and a pump connected thereto to one of a plurality of predetermined preset speeds to thereby control the flow of water through the hydromassage pump comprising a low voltage user interface and a high voltage motor power control which is connected to, but electrically isolated from, said user interface, said low voltage user interface including storage means for storing therein a plurality of preset pump motor speeds, each of which is indicative of a desired pump motor speed, said storage means providing an output signal indicative of one of said plurality of said preset speeds, input means for energizing the pump motor at a speed indicated by said output signal of said storage means, and display means responsive to said output signal of said storage means for visually displaying an indication of the speed of the pump motor, said high voltage power control including a solid state switch means adapted to be connected in series with the pump motor and a source of high voltage electrical energy to energize the pump motor when the solid state switch means is conductive, controller means for controlling the conduction of said solid state switch means, and a limited energy power supply having an output for energizing said storage means, said display means and said input means.

15. A control for a hydromassage pump motor for controlling the speed of the pump motor and a pump connected thereto as defined in claim 14 further including an opto-isolator for coupling said output signal from said storage means to said controller means to control the conduction of said switch means in dependence upon the output signal of said storage means.

16. A control for a hydromassage pump motor for controlling the speed of the pump motor and a pump connected thereto as defined in claim 14 wherein said limited energy power supply includes a high frequency transformer having a primary coil connected to a source of high voltage electrical energy and a secondary coil coupled to said primary coil, and current limiting resistor means series connected with said primary coil for a limiting current flow through said primary coil to allow saturation of said transformer without excessive current buildup.

17. A control for a hydromassage pump motor for controlling speed of the pump motor and a pump connected thereto as defined in claim 16 wherein said output signal from said storage means has a predetermined duty cycle which is proportional to the desired pump motor speed.

18. A control for a hydromassage pump motor for controlling the speed of the pump motor and a pump connected thereto as defined in claim 17 further including filtering means for coupling the opto-isolator to said controller means, said filtering means filtering the output of said opto-isolator to establish a DC output signal from said filter means to said controller means which is indicative of the desired pump motor speed and is proportional to the duty cycle of said output signal from said storage means.

19. A control for a hydromassage pump motor for controlling the speed of a pump motor and a pump connected thereto as defined in claim 16 wherein said limited energy power supply further includes voltage regulating means connected to the output thereof for regulating the voltage at said output of said limited energy power supply.

20. A control for a hydromassage pump motor for controlling the speed of a pump motor and a pump connected thereto as defined in claim 19 further including second current limiting resistor means series connected to said secondary coil of said transformer to limit the current at said output of said limited energy power supply.

21. A control for a hydromassage pump motor for controlling the speed of a pump motor and a pump connected thereto as defined in claim 16 wherein said solid state switch means comprises a triac, said source of high voltage energy comprises an AC power supply and said controller means controls the conduction of said triac at a conduction angle with respect to the phase angle of the AC power supply which is proportional to the duty cycle of said output signal from said storage means to thereby control the speed of the hydromassage pump motor and the volume of fluid flow through the pump.

22. A control for a hydromassage pump motor for controlling the speed of a pump motor and a pump connected thereto as defined in claim 21 wherein said display means comprises a liquid crystal bar graph for visually displaying the output speed of the pump motor as indicated by the output signal from said storage means.

23. A control for a pump motor for controlling the speed of the pump motor and a pump connected thereto to one of a plurality of predetermined preset speeds to thereby control the flow of water through the pump comprising in combination: a low voltage user interface and a high voltage motor power control which is connected to, but electrically isolated from, said user interface, said low voltage user interface including storage means for storing therein a plurality of preset speeds, each of which is indicative of a desired pump motor speed, said storage means providing an output signal indicative of one of said plurality of said preset speeds, a first input means for energizing the pump motor at a speed indicated by said output signal of said storage means, second input means connected to said storage means for indexing the output signal of said storage means to the next sequential preset speed of said plurality of preset speeds, and display means responsive to said output signal of said storage means for visually displaying an indication of the speed of the pump motor, said high voltage power control including a solid state switch means adapted to be connected in series with the pump motor and a source of high voltage electrical energy to energize the pump motor when the solid state switch means is conductive, controller means for controlling the conduction of said solid state switch means and means including an opto-isolator for coupling said output signal from said storage means to said controller means to control the conduction of said switch means in dependence upon the output signal of said storage means.

* * * * *